United States Patent [19]

Frommelt

[11] 4,422,199
[45] Dec. 27, 1983

[54] DOCKBOARD SEAL

[75] Inventor: Sylvan J. Frommelt, Peosta, Iowa

[73] Assignee: Frommelt Industries, Inc., Dubuque, Iowa

[21] Appl. No.: 310,328

[22] Filed: Oct. 9, 1981

[51] Int. Cl.³ .............................................. E01D 1/00
[52] U.S. Cl. ...................................... 14/71.1; 14/71.3
[58] Field of Search ...................... 14/71.3, 71.1, 71.5, 14/71.7

[56] References Cited

U.S. PATENT DOCUMENTS

| | | | |
|---|---|---|---|
| 2,681,698 | 6/1954 | Herman | 14/71.1 X |
| 2,904,802 | 9/1959 | Hartman | 14/71.3 |
| 2,924,336 | 3/1961 | Kelley | 14/71.3 |
| 3,117,332 | 1/1964 | Kelley | 14/71.3 |
| 3,137,017 | 6/1964 | Pfleger | 14/71.3 |
| 3,255,478 | 6/1966 | Lambert | 14/71.7 |
| 3,456,274 | 7/1969 | McGuire | 14/71.7 |
| 4,110,860 | 9/1978 | Neff | 14/71.7 |

Primary Examiner—Nile C. Byers, Jr.
Attorney, Agent, or Firm—Emrich, Lee, Brown & Hill

[57] ABSTRACT

A flexible seal for use in adjustable dockboard unit for sealing the unit against the flow of air therethrough into and/or out of the building in which the dockboard is being used.

12 Claims, 6 Drawing Figures

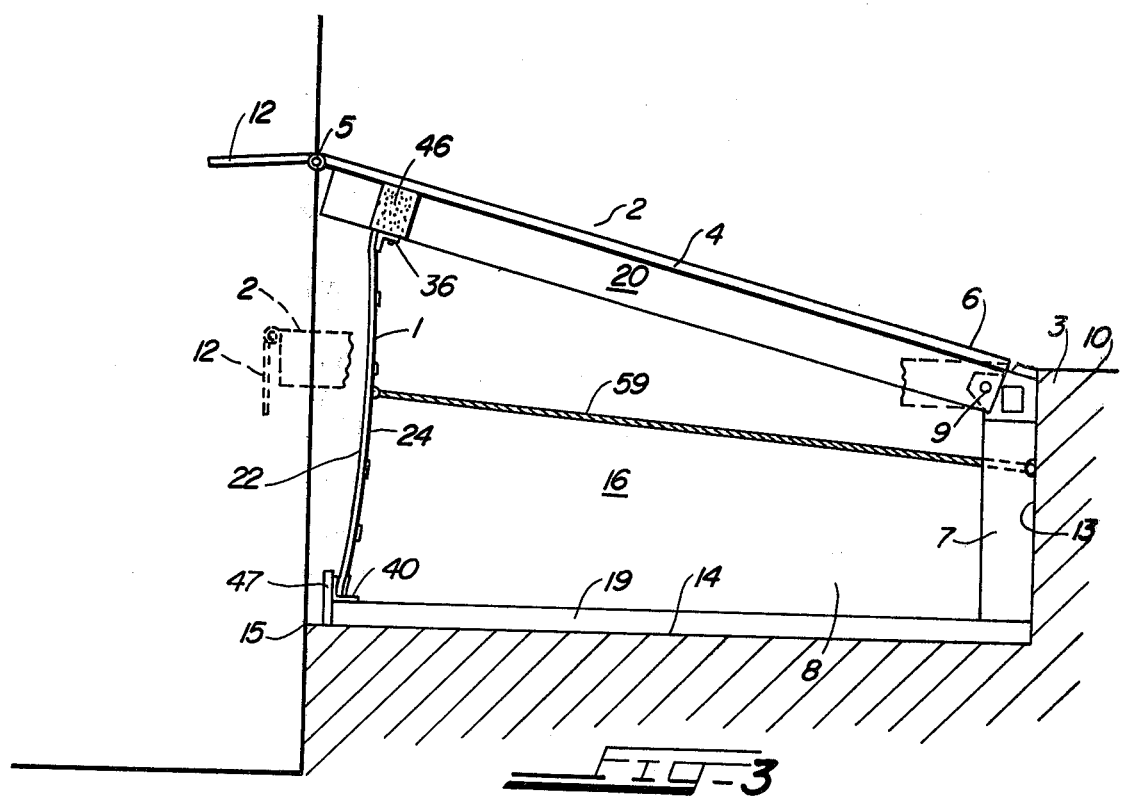
FIG-3
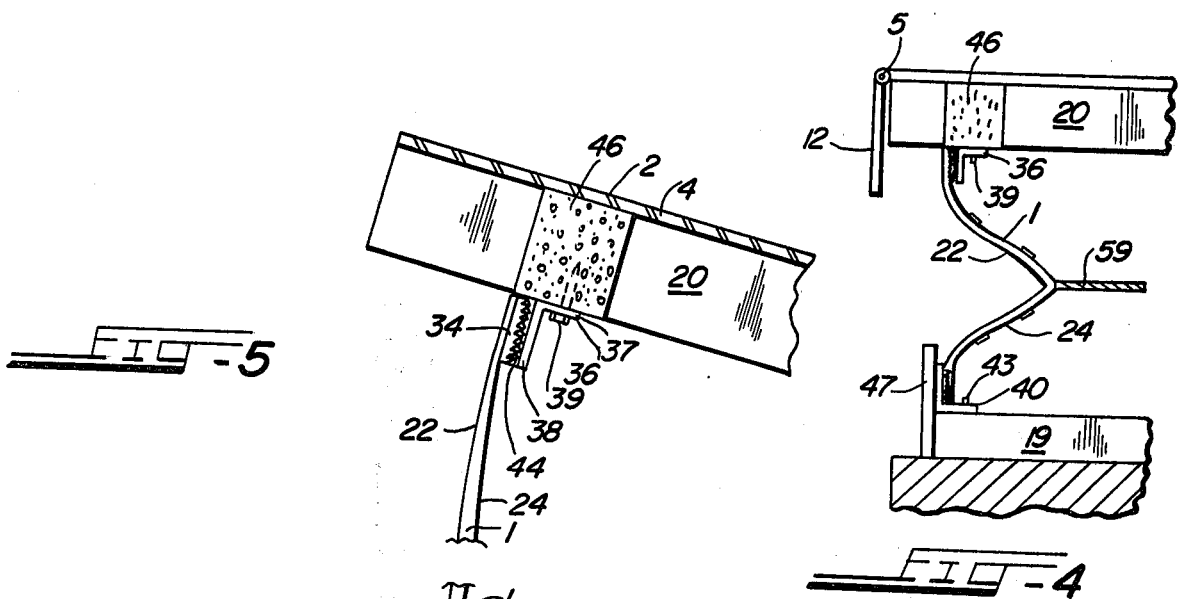
FIG-5
FIG-4
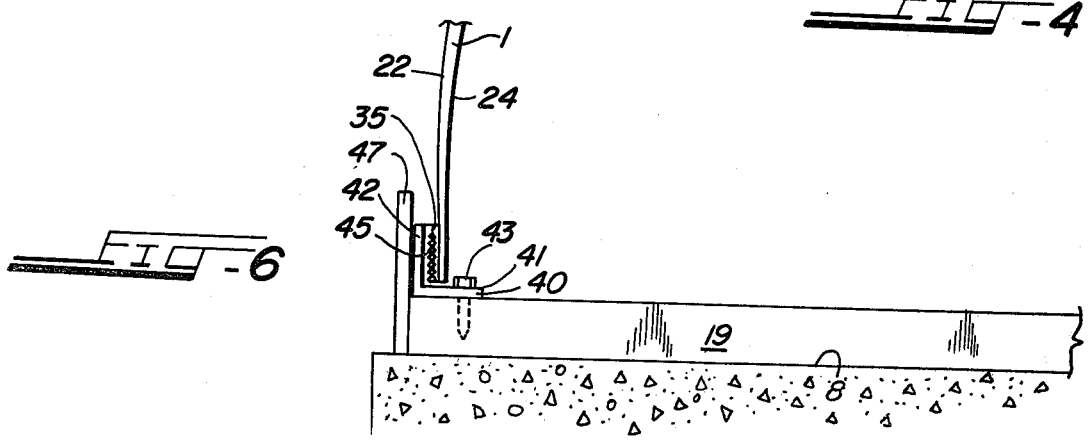
FIG-6

DOCKBOARD SEAL

BACKGROUND OF THE INVENTION

This invention relates to seals, and, more particularly, to flexible seals which are particularly well adapted for use with adjustable dockboards, and the like.

A primary object of the present invention is to afford a novel seal.

Another object of the present invention is to afford a novel flexible seal for use with adjustable dockboards.

Adjustable dockboards, for use in the floors of loading docks, and the like, are well known in the art, being shown, for example, in U.S. Pat. No. 2,924,336 issued to G. P. Kelley on Mar. 14, 1961; U.S. Pat. No. 3,117,332, issued to G. P. Kelley et al on Jan. 14, 1964; and U.S. Pat. No. 3,137,017, issued to R. H. Pflager et al on June 16, 1964. As is well known to those skilled in the art, one troublesome and common problem in the use of dockboards of the aforementioned type has been the relatively free circulation of air therethrough into and out of the buildings in which such dockboards have been used, thus creating a heating and/or cooling problem. Various manners of trying to overcome this problem have been heretofore tried, such as, for example, using a drop-curtain on the dockboard, or permanently closing in the front of the depression over which the dockboard is located. Such previous attempts to solve the aforementioned problem have had several inherent disadvantages, such as, for example, not being practical and efficient in operation; being complicated in construction and operation; not being reliable in operation; requiring undesired modifications; or being expensive to install, and the like. It is an important object of the present invention to overcome such disadvantages.

Another manner of overcoming the aforementioned problem is disclosed in my previously filed application for U.S. Pat. Ser. No. 107,034, filed Dec. 26, 1979, now issued as U.S. Pat. No. 4,293,969. This last mentioned manner involves the use of an inflatable seal, which has proven highly successful, efficient and effective in operation. It is an object of the present invention to afford a novel seal for use with adjustable dockboards, which seal, while being successful, efficient and effective in operation, is simpler in construction and operation than the aforementioned inflatable seal.

A further object of the present invention is to afford a novel inflatable seal which is effective to seal the entire front of the depression over which such a dockboard is located.

An object which is ancillary to the foregoing is to afford a novel flexible seal of the aforementioned type, which is so constituted and arranged that the side edges thereof are effectively held in sealing engagement with the side walls of such a depression in a novel and expeditious manner.

Another object of the present invention is to afford a novel seal of the aforementioned type which may be quickly and easily installed in operative position in an adjustable dockboard unit.

A further object of the present invention is to afford a novel seal of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 3 is a side elevational view of the adjustable dockboard unit and seal shown in FIG. 1, with the lowered position of the dockboard unit being fragmentarily indicated in broken lines;

FIG. 4 is a fragmentary side elevational view of the dockboard unit shown in FIG. 3, showing the dockboard and seal in lowered position;

FIG. 5 is a fragmentary, enlarged side elevational view of the front portion of the dockboard unit and the upper portion of the seal shown in FIG. 3; and FIG. 6 is a fragmentary, enlarged side elevational view of the lower portion of the seal shown in FIG. 3.

DESCRIPTION OF THE EMBODIMENT SHOWN HEREIN

Figure 1:
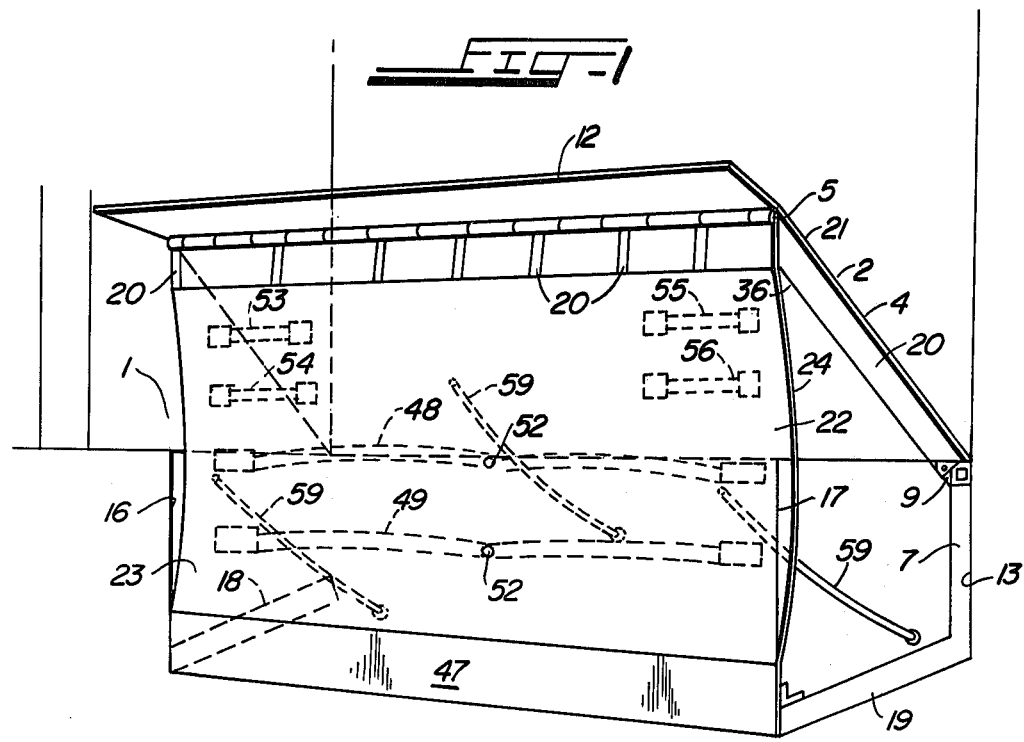
FIG. 1 is a fragmentary, front perspective of a loading dock embodying an adjustable dockboard unit, which includes a flexible seal embodying the principles of the present invention, and showing the dockboard unit in raised position.

A flexible seal 1 is shown in the drawings in operative position relative to an adjustable dockboard unit 2, which is mounted in a loading dock 3, to illustrate the presently preferred embodiment of the present invention.

The dockboard unit 2 may be made of any suitable type readily available on the market, the particular unit 2, shown in the drawings, being of the type shown in my aforementioned application for U.S. Pat. Ser. No. 107,034 and embodying an elongated ramp 4, having a front end portion 5 and a rear end portion 6, with the rear end portion 6 hingedly connected to a supporting frame 7 disposed in a shallow pit or depression 8 in the loading dock 3, FIG. 2. In operation, the ramp 4 is movable around its hinged connection 9 with the supporting frame 7 between a normal, lowered, at-rest position, wherein it is disposed in uniplanar relation to the floor 10 of the loading dock 3, as shown in broken lines in FIG. 3, and a raised position, wherein it projects upwardly from its hinged connection 9 with the supporting frame 7 at a forwardly opening acute angle to the plane of the floor 10, as shown in solid lines in FIG. 3. Such raising and lowering of the ramp 4 may be accomplished by any suitable mechanism, not shown, such as, for example, by raising and lowering mechanism of the type shown in the aforementioned Pflager et al U.S. Pat. No. 3,137,017.

Preferably, the dockboard unit 2 also embodies an extension lip 12 hingedly connected to the front end portion 5 of the ramp 4 for movement between a substantially vertically disposed, depending position, when the dockboard unit 2 is disposed in the aforementioned lowered position, as shown in broken lines in FIG. 3, and a forwardly parojecting raised position, as shown in solid lines in FIG. 3, when the ramp 4 is disposed in raised position. Such raising and lowering of the extension lip 12 may be accomplished in any suitable manner, such as, for example, manually or by mechanism of the type disclosed in the aforementioned Pflager U.S. Pat. No. 3,137,017.

In the preferred form of the invention shown in the drawings, the pit 8 is disposed in a concrete portion of the loading dock 3, and embodies an upright rear wall 13, with a flat, bottom wall 14 projecting horizontally forwardly from the bottom of the rear wall 13 to the open end 15 of the pit 8, and with two vertically upright side walls 16 and 17 projecting upwardly from opposite sides of the bottom wall 14 and extending forwardly from the rear wall 13 to the front end 15 of the pit 8.

In the dockboard unit 2, shown in the drawings, the supporting frame 7 includes two elongated reinforcing beams 18 and 19, FIG. 1, projecting from the rear portion of the pit 8 to the front portion thereof in substantially parallel relation to each other and terminating in rearwardly spaced relation to the front end 15 of the pit 8, FIG. 3; and the ramp 4 embodies a plurality of elongated reinforcing beams 20, FIG. 1, disposed in spaced parallel relation to each other from one side of the ramp 4 to the other side thereof, and projecting from the rear portion of the pit 8 to the front portion thereof in underlying, reinforcing relation to the deck 21 of the ramp 4, one such beam being shown in FIGS. 3 and 5.

Figure 2:
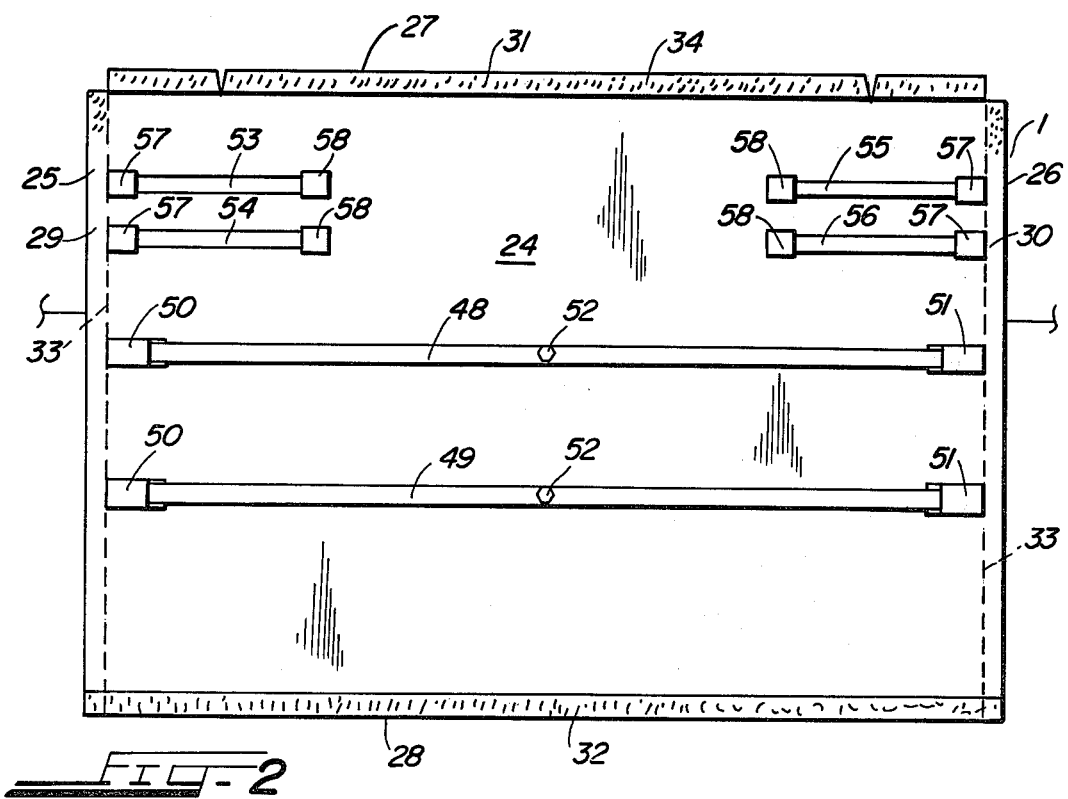
FIG. 2 is a rear elevational view of the flexible seal shown in FIG. 1.

The flexible seal 1 embodies a substantially rectangular-shaped body portion in the form of a sheet 22, having a front face 23 and a rear face 24, FIGS. 1 and 3, extending between two oppositely disposed sides 25 and 26, and a top 27 and a bottom 28, FIG. 2. The body portion 22 of the flexible seal 1 may be made of any suitable, substantially air-impervious material, such as, for example, rubber impregnated nylon fabric, or the like.

Each of the edges 25-28 defines the outer edge of a respective flap 29, 30, 31 and 32, which projects outwardly from the central body portion 33 of the sheet 22, FIG. 2. A quick release fastening member in the form of a suitable adhesive strip 34 is secured to and extends along the rear face of the upper flap 31 of the body portion 22, FIGS. 2 and 5, and, similarly, such an adhesive strip 35 is secured to and extends along the front face of the lower flap 32, for a purpose which will be discussed in greater detail presently.

An elongated, substantially straight beam 36, in the form of an angle iron having two legs 37 and 38, FIGS. 3 and 5, is mounted on the lower face of the beams 20 and secured thereto by suitable means such as bolts 39 extending through the leg 37, the beam 36 extending substantially the full width of the ramp 4. Similarly, an elongated, substantially straight beam 40, in the form of an angle iron having two legs 41 and 42, is mounted on the beams 18 and 19 and secured thereto by suitable means, such as, bolts 43, FIGS. 3 and 6, the beam 40 extending substantially the full width of the pit 8. The beams 36 and 40 may be made of any suitable material, such as, for example, aluminum.

A quick release fastening member in the form of a suitable adhesive strip 44 is secured to and extends along the front face of the leg 38 of the beam 36, FIG. 5, and, similarly, such an adhesive strip 45 is secured to and extends along the rear face of the leg 42 of the beam 40, for a purpose which will be discussed in greater detail presently.

In securing the flexible seal 1 in operative position in the loading dock 3, the adhesive strip 34 may be pressed into firm adhesive engagement with the strip 44, and the adhesive strip 35 may be pressed into firm adhesive engagement with the strip 35. The adhesive on the strips 34 and 35 and on the strips 44 and 45 may be any suitable material, such as, for example, a suitable pressure-sensitive adhesive material, readily available on the market and which may be repeatedly adherred to and released from each other. However, preferably the adhesive is a fastening material of the type readily available on the market under the trademark Velcro, with the adhesive on the two strips 34 and 35 constituting a brushed suitable material such as, nylon, or the like, to present a fuzzy face, and the adhesive on the other two strips 44 and 45 comprising a plurality of small hooks formed from nylon, or the like, with the hooks operable to releasably engage in and thereby adhere to the fuzzy faces of the respective complimentary strips 34 and 35.

With this construction, it will be seen that the strips 34 and 44 and the strips 35 and 45 are firmly but releasably adherred to each other, respectively, to afford a strong connection between the seal 1 and the beams 36 and 40, respectively, but with the connection being one which may be relatively easily, manually torn apart if it is desired to remove the seal 1 for repair or replacement, or to gain access to the interior of the pit 8. As will be appreciated by those skilled in the art, the seal 1 is shown herein as being adhesively secured to the ramp 4 and the bottom of the depression 8 by way of illustration of the preferred embodiment of the present invention, and it may be otherwise secured, such as, for example, by nails or screws, without departing from the purview of the broader aspects of the present invention. However, the adhesive securing of the shield 1 to the beams 36 and 40 has the additional advantage over such other releasable forms of securing the same that if a truck backing in to the loading dock in which the shield 1 is mounted should have a projection extending from the rear thereof that engaged the shield 1, the adhesive connection of the bottom portion of the seal 1 to the rear face of the beam 40 affords a safety-release type of connection whereby the shield 1 can be released from its connection with the beam 4 without damaging the shield 1.

In the preferred form of the invention shown in the drawings, the spaces between the top of the beam 36 and bottom of the deck 21 of the ramp 4, not filled by the beams 20, are filled with a suitable, substantially air impervious sealing or insulating material 46, FIGS. 3–5, such as a foamed polyether or polyester. Preferably, the material 46 is adhesively secured to the lower face of the deck 21 of the ramp 4.

An elongated plate 47, FIGS. 1 and 3, is secured to the front face of the beam 40 and projects from the bottom 14 of the pit 8 above the top of the beam 40, and extends longitudinally across the full width of the pit 8.

Two elongated flexible stays 48 and 49 are mounted on the rear face 24 of the central body portion 33 of the seal 1 in horizontally extending, substantially parallel relation to each other, the opposite ends of each of the stays 48 and 49 terminating at the inner edges of the flaps 29 and 30 of the seal 1, respectively, and being mounted in respective pockets 50 and 51, secured to the rear face of the central body portion 33 by suitable means, such as, for example, stitching. The centers of the stays 48 and 49 are secured to the central body portion 33 of the seal 1 by suitable means, such as rivets 52, or the like. Preferably, the bottom stay 49 is disposed on the seal 1 approximately one third of the distance from the bottom 28 thereof to the top 27 thereof, and the upper stay 48 is disposed on the rear face of the seal 1 at or slightly above the midpoint between the bottom 28 and the top 27 thereof.

Two pairs of additional stays 53 and 54, and 55 and 56 are similarly secured to the upper left and upper right corners, respectively, of the rear face 24 of the central body portion 33 of the seal 1, FIG. 2, the seals 53 and 54 and the seals 55 and 56 in each of the pair of seals being disposed in horizontally extending, substantially parallel relation to each other, with the seals 53 and 55 and the seals 54 and 56 being disposed in spaced, substantially longitudinal alignment with each other. The outer and inner ends of each of the stays 53–56 are mounted in respective outer and inner pockets 57 and 58 secured to the rear face 24 of the body portion 33 of the seal 1 by suitable means, such as, for example, stitching, the pockets 57 in which the stays 53 and 54 are disposed being disposed inwardly of, but adjacent to the flap 29, and the outer pockets 57 in which the stays 55 and 56 are disposed being disposed inwardly of but adjacent to the flap 30. The pockets 50, 51, 57 and 58 may be of any suitable material, such as, for example, neoprene, and the stays 48, 49, and 53–56 may be made of any suitable flexible material, but preferably are made of a suitable, soft, yieldable, flexible material, such as, for example, cylinders of soft rubber or of the foamed material available on the market under the trademark Scotch Ply.

In the preferred form of the seal 1, the length of the stays 48 and 49 is such that when the seal 1 is disposed in uninstalled position, as shown in FIG. 2, they hold the body portion 33 thereof in taut condition between the flaps 29 and 30; and the length of the stays 53–56 is such that they hold the upper left and upper right corners of the body portion 33 taut between the flaps 29 and 30 and the respective adjacent inner pockets 58. Preferably, each of the stays 53 and 54 extends approximately one fourth of the distance between the flaps 29 and 30.

Preferably, the width of the seal 1 is such that when it is mounted between the beams 36 and 40 in a loading dock unit 2, the edges of the body portion 33 adjacent to the flaps 29 and 30 are disposed in such closely adjacent relation to the side walls 16 and 17 of the pit 8 that bending pressure is applied to the stays 48, 49 and 53–56, by reason of the engagement of the flaps 29 and 30 with the side walls 16 and 17, respectively, so that the flaps 29 and 30 are firmly, but yieldingly, held in wiping engagement with the side walls 16 and 17, as illustrated in FIG. 1. With this construction, an effective seal is afforded between the seal 1 and the side walls 16 and 17 of the pit 8 against the flow of air therebetween.

Additionally, at least one resilient tension element or cord 59, made of any suitable material, such as, for example, bungee cord, are secured at its front end in spaced relation to the central body portion 33 of the seal 1, FIG. 1, and the rear end thereof is preferably secured to the back wall 13 of the pit 8, in rearwardly spaced relation to the body portion 33, as shown in FIG. 3. However, it is within the scope of the present invention to secure or anchor the tension cord to the low side walls 16 and 17 to provide sealing engagement of the seal with the side walls of the pit. Although three tension cords 59 are shown in FIG. 1, it is within the scope of the present invention that one or more tension elements may be utilized if properly positioned to engage the seal 1. The tension cords or means 59 are of such strength and length that when the ramp 2 is disposed in raised position, as shown in FIG. 3, they are effective to bow the shield 1 rearwardly only slightly, FIG. 3, but when the ramp 2 is disposed in lowered position, as shown in FIG. 4, they are effective to bow the entire central body portion 33 of the seal 1 rearwardly into the pit 4, FIG. 4, so that it affords a neat appearance from the outside of the building in which it is disposed, and, in addition, so that it is held inwardly for protection against damage. Even in such collapsed position of the seal 1, the stays 48, 49, and 53–56 are effective to hold the flaps 29 and 30 in effective, sealing engagement with the side walls 16 and 17, respectively, of the pit 8.

With this construction, it will be seen that the seal 1 is automatically movable with the dock leveler 2 between the latters raised and lowered positions, as shown in FIGS. 3 and 4, and, in addition, is effective, at all times, to maintain an effective seal against the passage of air inwardly through the pit 8, between the resilient material 46 and the plate 47, so that the pit 8 is rendered substantially impervious to the flow of outside air thereinto.

From the foregoing it will be seen that the present invention affords a novel flexible seal.

In addition, it will be seen that the present invention affords a novel, effective seal for use with adjustable dockboard units.

Also, it will be seen that the present invention affords a novel seal of the aforementioned type which is practical and efficient in operation, and which may be readily and economically produced commercially.

Thus, while I have illustrated and described the preferred embodiment of my invention, it is to be understood that this is capable of variation and modification, and I therefore do not wish to be limited to the precise detail set forth, but desire to avail myself of such changes and alterations as fall within the purview of the following claims.

I claim:

1. In an adjustable dockboard for spanning the gap between a loading dock and the bed of a carrier in loading or unloading position in front of the dock, the dockboard embodying a stationary mounting structure, a ramp having front and rear portions, with the rear portion hingedly connected to said mounting structure so that the ramp can swing up and down around a horizontal axis between a raised position wherein it is disposed at a forwardly opening acute angle to the horizontal above the floor of the loading dock and a lowered position wherein it is disposed in horizontally extending position wherein it is substantially flush with said floor of said loading dock, and said mounting structure including a depression in said loading dock, said depression embodying two oppositely disposed side walls, between which said ramp is disposed when it is disposed in said lowered position, a rear wall and an open front, the combination of
   a. a flexible sheet member
      (1) mounted in the depression and extending
         (a) between the depression and
         (b) between the front portion of the ramp and the bottom of the depression,
   b. said flexible sheet member being movable between
      (1) a collapsed position wherein it is disposed between the lowered ramp and the bottom of the depression, and (2) an extended position wherein it is disposed between the raised ramp and the bottom of the depression.

2. The combination, in an adjustable dockboard, defined in claim 1, and which includes
   a. means secured to said flexible sheet member for holding the lateral sides thereof in engagement with the two oppositely disposed side walls when said flexible sheet member is disposed in said extended position.

3. The combination, in an adjustable dockboard, defined in claim 1, and in which
   a. the top of said flexible sheet member is secured to the front portion of said ramp,
   b. the bottom of said flexible sheet member is secured to the bottom of the depression, and
   c. the opposite lateral side portions of said flexible sheet member are disposed in wiping engagement with respective ones of the side walls of the depression in all positions of said flexible sheet member.

4. The combination, in an adjustable dockboard, defined in claim 3, and which includes
   a. resilient members
      (1) attached to one face of said flexible sheet member,
      (2) extending laterally across said one face, and
      (3) terminating inwardly of the lateral side edges of said flexible sheet member in position to yieldingly hold said side portions of said flexible sheet member in said wiping engagement with the side walls.

5. The combination, in an adjustable dockboard, defined in claim 4, and in which
   a. said resilient members comprise elongated rods of resilient material extending laterally across said one face in vertically spaced relation to each other.

6. The combination, in an adjustable dockboard, defined in claim 5, and in which
   a. said material comprises soft, resilient rubber.

7. The combination, in an adjustable dockboard, defined in claim 3, and in which
   a. said flexible sheet member is releasably secured to the front portion of the ramp and the bottom of the depression.

8. The combination, in an adjustable dockboard, as defined in claim 3, and in which
   a. said flexible sheet member is releasably, adhesively secured to the front portion of the ramp and the bottom of the depression.

9. In an adjustable dockboard for spanning the gap between a loading dock and the bed of a carrier in loading or unloading position in front of the dock, the dockboard embodying a stationary mounting structure, a ramp having front and rear portions, with the rear portion hingedly connected to said mounting structure so that the ramp can swing up and down around a horizontal axis between a raised position wherein it is disposed at a forwardly opening acute angle to the horizontal above the floor of the loading dock and a lowered position wherein it is disposed in horizontally extending position wherein it is substantially flush with said floor of said loading dock, and said mounting structure including a depression in said loading dock, said depression embodying two oppositely disposed side walls, between which said ramp is disposed when it is disposed in said lowered position, a rear wall and an open front, and wherein the bottom of said ramp comprises a plurality of elongated beams extending between the front and rear edges thereof in substantially parallel spaced relation to each other, the combination of
   a. means disposed between said beams at said front portion of said ramp for closing the spaces therebetween,
   b. a flexible sheet member having
      (1) a top,
      (2) a bottom, and
      (3) two oppositely disposed side portions,
   c. means securing said top of said sheet member to the bottom of said beams across substantially the full width of said front portion of said ramp,
   d. means securing said bottom of said sheet member to the bottom of said depression across substantially the full width of said depression between said side walls thereof,
   e. said sheet member being movable upwardly and downwardly by said ramp between said raised and lowered positions of the latter, and
   f. elongated resilient members extending laterally across one face of said sheet member in position to hold said side portions of said sheet member in wiping engagement with respective ones of said sides of said depression in all positions of said sheet member.

10. The combination, in an adjustable dockboard, defined in claim 9, and which includes
    a. resilient means secured to and extending between the rear face of the central body portion of said sheet member and wall portions of said depression in position to yieldingly collapse said sheet member rearwardly into said depression during lowering of said ramp.

11. The combination, in an adjustable dockboard, defined in claim 9, and in which
    a. said means securing the top of said flexible member comprises
       (1) an elongated member
          (a) mounted on said beams, and
          (b) extending across substantially the full width of said ramp, and
       (2) adhesive members mounted on the top portion of said flexible member and said elongated member and disposed in releasable adhesive engagement with each other, and
    b. said means securing the bottom of said flexible member comprises
       (1) another elongated member
          (a) mounted on said bottom of said depression, and
          (b) extending across substantially the full width of said bottom between said side walls, and
       (2) adhesive members mounted on the bottom portion of said flexible member and said elongated member and disposed in releasably adhesive engagement with each other.

12. The combination, in an adjustable dockboard, defined in claim 11, and
    a. which includes
       (1) outer pockets secured to the rear face of the central body portion of said sheet member adjacent to and inwardly of said outer portions of said sheet member at both sides of the latter, and
       (2) inner pockets secured to the rear face of the central body portion of said sheet member in inwardly spaced alignment with respective ones of said outer pockets on the upper portion of said sheet member, and b. in which
 (1) certain ones of said resilient members are disposed in respective pairs of said outer and inner pockets, and
 (2) other of said resilient members are disposed in respective pairs of said outer pockets disposed at opposite sides of said sheet member in downwardly spaced relation to said certain ones of said resilient members.

* * * * *